(12) United States Patent
Pacina et al.

(10) Patent No.: US 9,311,515 B2
(45) Date of Patent: Apr. 12, 2016

(54) AUTOMATIC TUNING OF SCANNER LIGHTING

(71) Applicant: NCR Corporation, Duluth, GA (US)

(72) Inventors: Andreval Diego Pacina, Cebu (PH);
Eugene S. Ynclino, V., Cebu (PH);
Ferdinand Uy Calderon, Cebu (PH)

(73) Assignee: NCR Corporation, Duluth, GA (US)

( * ) Notice: Subject to any disclaimer, the term of this patent is extended or adjusted under 35 U.S.C. 154(b) by 0 days.

(21) Appl. No.: 14/472,654

(22) Filed: Aug. 29, 2014

(65) Prior Publication Data

US 2016/0063291 A1    Mar. 3, 2016

(51) Int. Cl.
*G06K 15/00* (2006.01)
*G06K 7/10* (2006.01)

(52) U.S. Cl.
CPC .................. *G06K 7/10732* (2013.01)

(58) Field of Classification Search
CPC ... G06Q 30/06; G06Q 20/20; G06K 7/10851; G06K 7/10772; G06K 7/10881; G06K 7/10811; G06K 7/10702; G06K 7/10732; G06K 7/10722
USPC ............ 235/383, 462.06, 462.2, 462.22, 235/462.23, 462.42
See application file for complete search history.

(56) References Cited

U.S. PATENT DOCUMENTS 5,777,315 A * 7/1998 Wilz .................... G02B 26/106
235/375

* cited by examiner

*Primary Examiner* — Karl D Frech
(74) *Attorney, Agent, or Firm* — Schwegman, Lundberg & Woessner

(57) ABSTRACT

Various embodiments herein each include devices, system, methods, and software for automatic scanner lighting tuning. One method embodiment includes determining a distance from a scanning surface to a surface of an item presented for scanning, determining an illumination setting based on the determined distance, and illuminating a scanning field according to the determined setting. Another embodiment is a scanner including a scanning module with a scanning surface imaged by an imaging device and a lighting module including at least one adjustable lighting element that illuminates according a received illumination setting. The scanner further includes a distance determining module that determines a distance between the scanning surface and a presented item and a lighting controller that receives a determined distance from the distance determining module, determines the illumination setting based on the determined distance, and provides the illumination command to the lighting module.

19 Claims, 6 Drawing Sheets

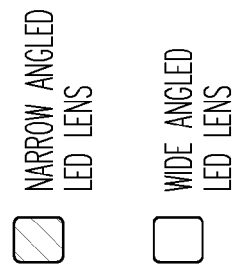
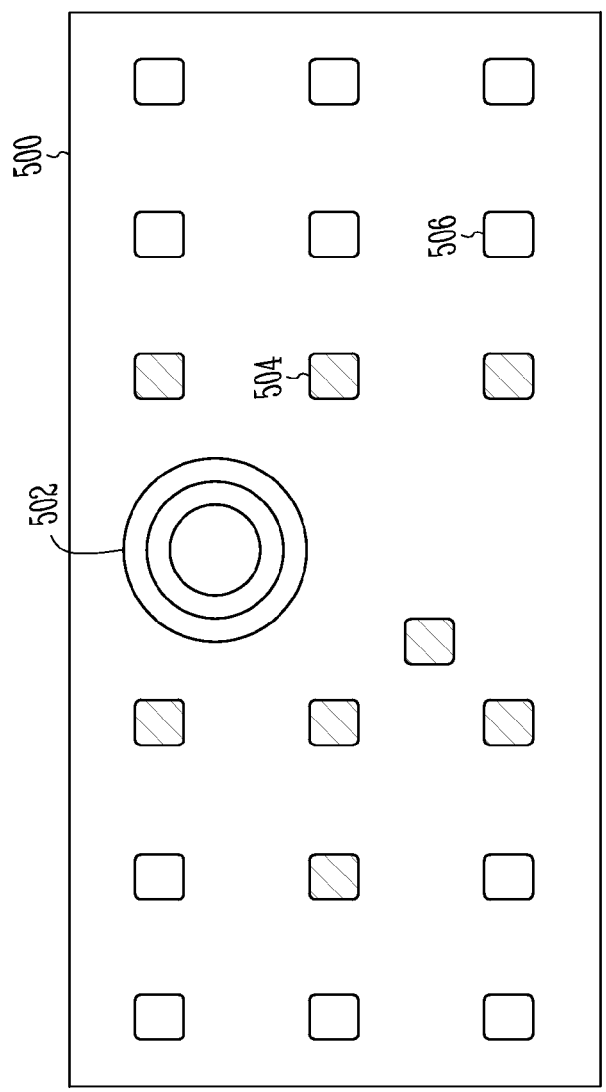
Fig. 5

AUTOMATIC TUNING OF SCANNER LIGHTING

BACKGROUND INFORMATION

Point-Of-Sale (POS) devices often include a variety of integrated devices, such as scanners, scales, integrated scanners with scales, card readers with on-screen signature capabilities, and the like.

Some scanners come equipped with a camera, while others come equipped with both a laser scanning device and a camera. The camera operates to detect a barcode facing the camera in captured images. Lighting is an element that can affect performance of scanners including a camera. When captured images are too bright or too dark, the camera may have difficulty detecting the bar code. Scanner, and associated POS device, operation is negatively impacted when barcodes cannot be read efficiently.

SUMMARY

Various embodiments herein each include at least one of devices, system, methods, and software for automatic scanner lighting tuning.

Some method embodiments include determining a distance from a scanning surface to a surface of an item presented for scanning and determining an illumination setting based on the determined distance. The method then illuminates a scanning field according to the determined illumination setting.

Some other embodiments are of a scanner including a scanning module with a scanning surface imaged by an imaging device and a lighting module including at least one adjustable lighting element that is illuminated according a received illumination setting. The scanner of such an embodiment further includes a distance determining module that determines a distance between the scanning surface and a presented item. The scanner further includes a lighting controller that receives a determined distance from the distance determining module, determines the illumination setting based on the determined distance, and provides the illumination command to the lighting module.

BRIEF DESCRIPTION OF THE DRAWINGS

FIG. 5 is a multi-array lighting module, according to an example embodiment.

DETAILED DESCRIPTION

Figure 1:
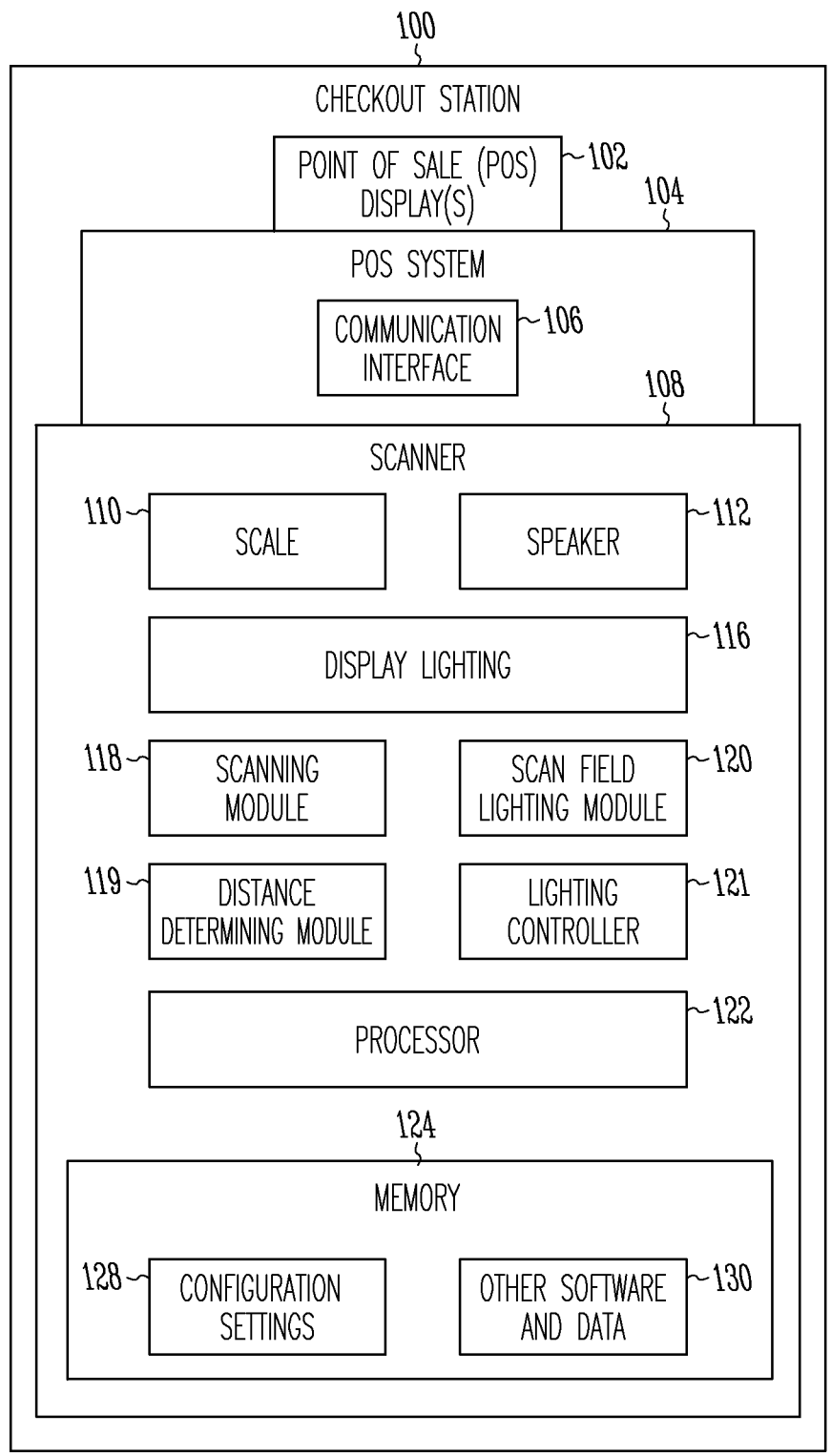
FIG. 1 is a diagram illustrating components of a checkout station having a scanner, according to an example embodiment.

Various embodiments herein each include at least one of devices, system, methods, and software for automatic scanner lighting tuning. Some such embodiments determine a distance of a surface of an item presented to be scanned from a scanning surface of a scanner, such as a scanner coupled to a Point of-Sale (POS) terminal commonly found in retail outlets. This distance is then utilized to determine how to illuminate the surface presented for scanning. Some embodiments further include image processing associated with barcodes captured in images of a camera-based scanner to tune lighting introduced into a scan field by one or more lighting arrays of the scanner. A further embodiment provides an integrated circuit board having at least two arrays of light emitting diodes thereon with each of the two arrays including lenses of two different angles—a narrower angle to focus light for more distant scanning of a presented item and a wider angle to focus light for closer scanning. These and other embodiments are described herein with reference to the figures.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on computer readable media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, an application integrated circuit (ASIC), microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

FIG. 1 is a diagram illustrating components of a checkout station 100 having a scanner 108, according to an example embodiment. It is to be noted that the checkout station 100 is shown schematically in greatly simplified form, with example components relevant to understanding various embodiments herein. The same situation may be true for the other various components of the checkout station 100. Note that the checkout station 100 may include more or fewer components in some embodiments.

Furthermore, the various components included in the FIG. 1 as illustrated and arranged are provided for illustration purposes only. It is to be noted that other arrangements with more or fewer components are possible without departing from the contributions herein, in particular with regard to automatic and remote scanner configuration.

Moreover, the methods and scanner presented herein and below may include all or some combination of the components shown in the context of the checkout station 100. Further, although a checkout station 100 is illustrated as including a scanner 108, the scanner 108 may be a standalone element or an element of other systems, devices, and terminals in other embodiment. Examples of other terminal-types that may include a scanner 108 are self-service terminals (SSTs), clerk operated and self-service library checkout stations, time-keeping terminals, and the like.

The methods of some embodiments are programmed as executable instructions in memory and/or non-transitory computer-readable storage media and executed on one or more processors associated with the components and devices herein. Some such components may be firmware.

The checkout station 100 includes one or more POS displays 102 that present information of a POS system 104 coupled to the one or more POS displays. Information presented by the one or more POS displays includes information relevant in a retail context and with regard to operation of the checkout station. The checkout station 100 also includes the scanner 108.

The scanner 108 may be referred to as a barcode scanner as that is the task most commonly associated with such devices. During operation of the checkout station 100, items are placed within a scan field of the scanner 108. One or more scanning modules 118 of the scanner 108, such as a camera, a laser scanner, or both, then scan a barcode of an item presented for scanning and information read therefrom is communicated to the POS system 104. The POS system 104 then uses that data to identify the item presented within the scan field and performs an additional function. The additional function may include a price lookup and addition of the item to a list of items to be purchased, which may be presented on the one or more POS displays 102.

The scanner 108 may include one or more scan fields, such as two scan fields of bi-optic scanners that are commonly seen in grocery and discount retail outlets. In addition to the scanning module 118, the scanner 108 may include various other components. The various other components may include an integrated scale 110 such as may be used in a grocery outlet to weigh produce and one or both of a speaker 112 and display lighting 116 to output audio a visual signals such as signals of (un)successful scans. The scanner 108 may also include one or more scan field lighting modules 120 that may be turned on and off and adjusted based on a detected presence of an item to be scanned, a distance from a scanning surface of an item presented for scanning.

In some embodiments, the scanner 108 includes a distance determining module 119 and a lighting controller 121. As illustrated, the distance determining module 119 and the lighting controller 121 are illustrated as hardware devices, such as firmware, ASICs, and the like. However in other embodiments, one or both of the distance determining module 119 and the lighting controller 121 may be present in software 130 stored in the memory and be executed by the processor 122.

The distance determining module 119 determines a distance between a scanning surface and an item presented for scanning. In some embodiments, the distance determining module includes an ultrasonic distance measuring device as are commonly available as integrated circuits. In some embodiments where the scanner 108 is a bi-optic scanner, there may be two distance determining modules 119, present on or in proximity to each of the two scanning surface. The distance determining module 119 determines the distance in such embodiments and provides the distance to the lighting controller 121.

In other embodiments, the distance determining module 119 may determine a distance between a scanning surface and an item presented for scanning based on where a surface of an item presented for scanning appears in an image received from the scanning module 118 with regard to one or more known distances within a field of view of a camera of the scanning module 118. For example, when the scanner 108 is a bi-optic scanner, the scanner 108 typically includes two scanning surfaces that are approximately perpendicular to one another—one scanning surface oriented vertically and the other horizontally. An image captured by a scanning module 118 of the horizontal scanning surface is processed in such embodiments to determine a distance of a surface of an item presented for scanning that is sufficiently parallel to the vertical scanning surface to be scanned by the scanning module 118 of the vertical scanning surface. An edge of the surface of the item presented for scanning by the vertical scanning surface may be detected by the image processing and a location of the edge is determined with regard to one or more known distance locations within the field of view of the scanning module 118 camera of the horizontal scanning surface. A similar process is also performed by the distance determining module 119 with regard to determining a distance between the item presented for scanning and a horizontal scanning surface except for the image processing is performed with regard to an image captured by a scanning module 118 camera of the vertical scanning surface.

In some embodiments, a bi-optic scanner may include two distance determining modules 119—one for each scanning surface. In other embodiments, a single distance determining module 119 may be shared between the two scanning surfaces.

Figure 2:
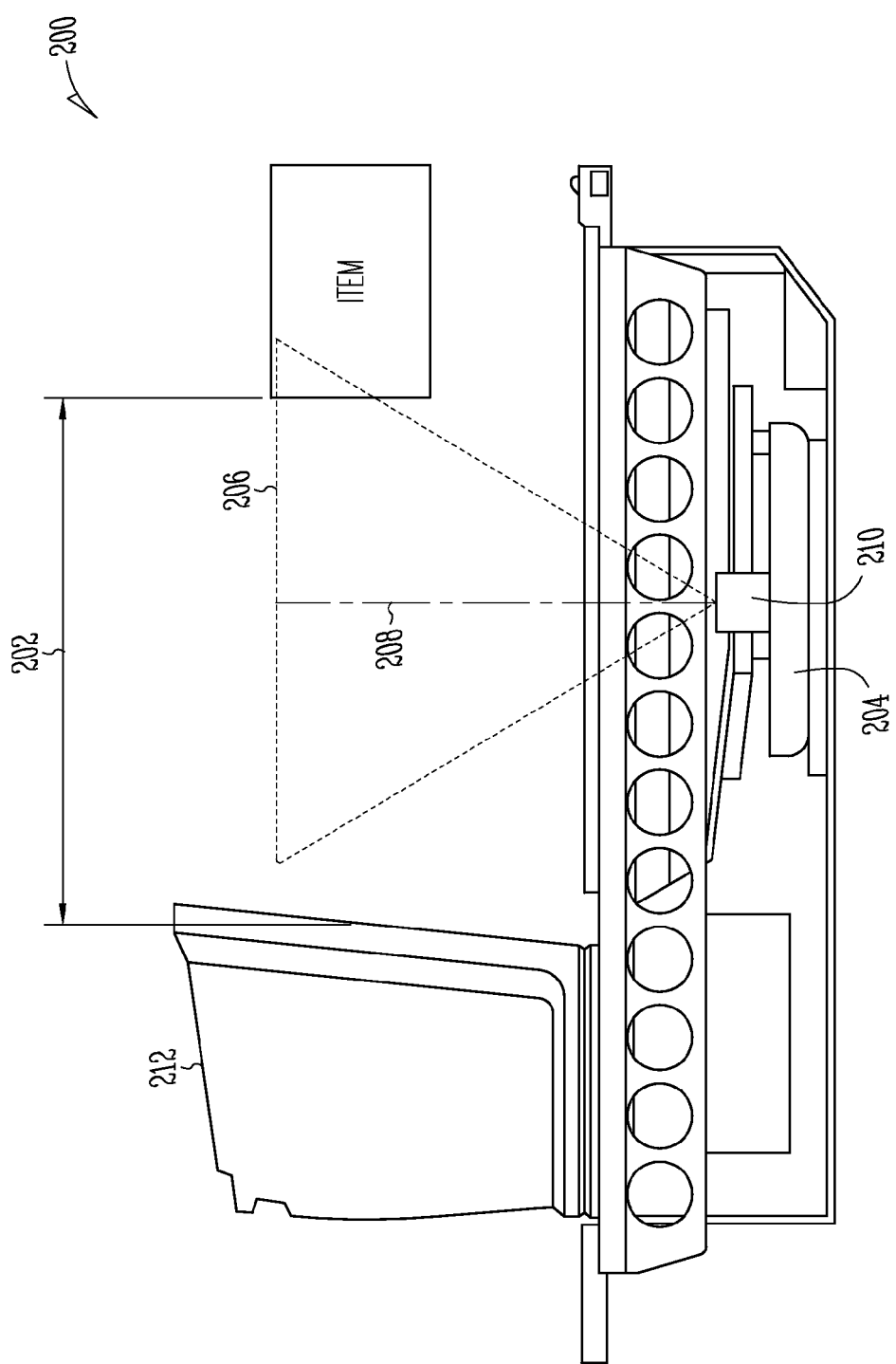
FIG. 2 is a scanner diagram, according to an example embodiment.

FIG. 2 provides an illustration with regard to image processing distance determination and is discussed further below.

Once the distance determining module 119 determine a distance between a scanning surface and an item presented for scanning, the distance is provided to the lighting controller 121. The lighting controller 121 uses the distance to determine or otherwise identify parameters for the scan field lighting module 120 to illuminate the scan field. In some embodiments, the configuration settings 128 store lighting settings with regard to various distances. The lighting settings may include brightness settings, identify one or more lighting arrays of the scan field lighting module to illuminate, and the like.

In some embodiments where the scanner 108 is a bi-optic scanner, there may be two lighting controllers 121—one dedicated to each scanning surface. Similarly, as bi-optic scanners include two scan fields that are oriented in different directions, bi-optic scanners that include a scan field lighting module 120 typically include two scan field lighting modules 120, one scan field lighting module deployed to each of the two scanning surfaces.

During typical operation, the scanner 108 is operated according to instructions executed on a processor 122. The processor may be an application integrated circuit, digital signal processor, microprocessor, or other type of processor. The instructions may be firmware or software 130 stored in one or more memories 124. The one or more memories 124 may be or include volatile and non-volatile memories, write-protected memories, write-once memories, random access memory (RAM), read only memories (ROM), and other memory and data storage types and devices.

The instructions as may be stored in firmware or as software 130 in memory 124 are executed according configuration settings stored in the memory 124. The configuration settings 128 configure operation of the scanner 108, the lighting controller 121, the scan field lighting module 120, and the various components therein. For example, the configuration settings 108 may configure speaker 112 volume, display lighting 116 outputs, scan field lighting module 120 brightness and lighting elements thereof based on a distance between a scanning surface and an item presented for scanning, decoding algorithm of the scanning module 118 and the instructions, one or more communication protocols used to communicate data from the scanner 108 to the POS system 106, such as via a wired or wireless communication interface 106 of the POS system 106, scale 110 operating parameters (e.g., unit of measure as pounds or kilograms), among other configuration settings the particular scanner 108 of an embodiment may include. In some embodiments, the configuration settings 128 may include a firmware version, a software version, and the like.

FIG. 2 is a scanner 200 diagram, according to an example embodiment. The illustrated scanner 200 is a an example of a bi-optic scanner on which image processing based distance determination is performed by a distance determining module, such as the distance determining module 119 discussed above with regard to FIG. 1. The scanner 200 is illustrated with regard to performing image processing based distance determination to determine a distance between a vertical scanning surface and a surface of an item presented for scanning based on an image captured by a camera 202 from the direction of the horizontal scanning surface. However, the same processing can be performed to determine a distance between the horizontal scanning surface and a surface of the item presented for scanning, although the image would be capture from a direction of the vertical scanning surface.

An image captured by the horizontal camera 204 of a field of view 206. The camera 204 field of view 206 includes a known reference point 208. The distance may be measured distance that may be used identify a lighting setting for one or more of the lights 210, 212. However, in some embodiments, the distance between the scanning surface and the item presented for scanning is determined as whether it is less or greater than the known reference point 208. As illustrated in FIG. 2, the item is greater than the known reference point 208. This information may then be used to identify a lighting setting, or be transmitted to another module to make the determination. Some embodiments may include more than one known reference point 208. In some further embodiments, a known reference point is a distance threshold range which may indicate each of two or more lights or lighting arrays are to be illuminated.

Figure 3:
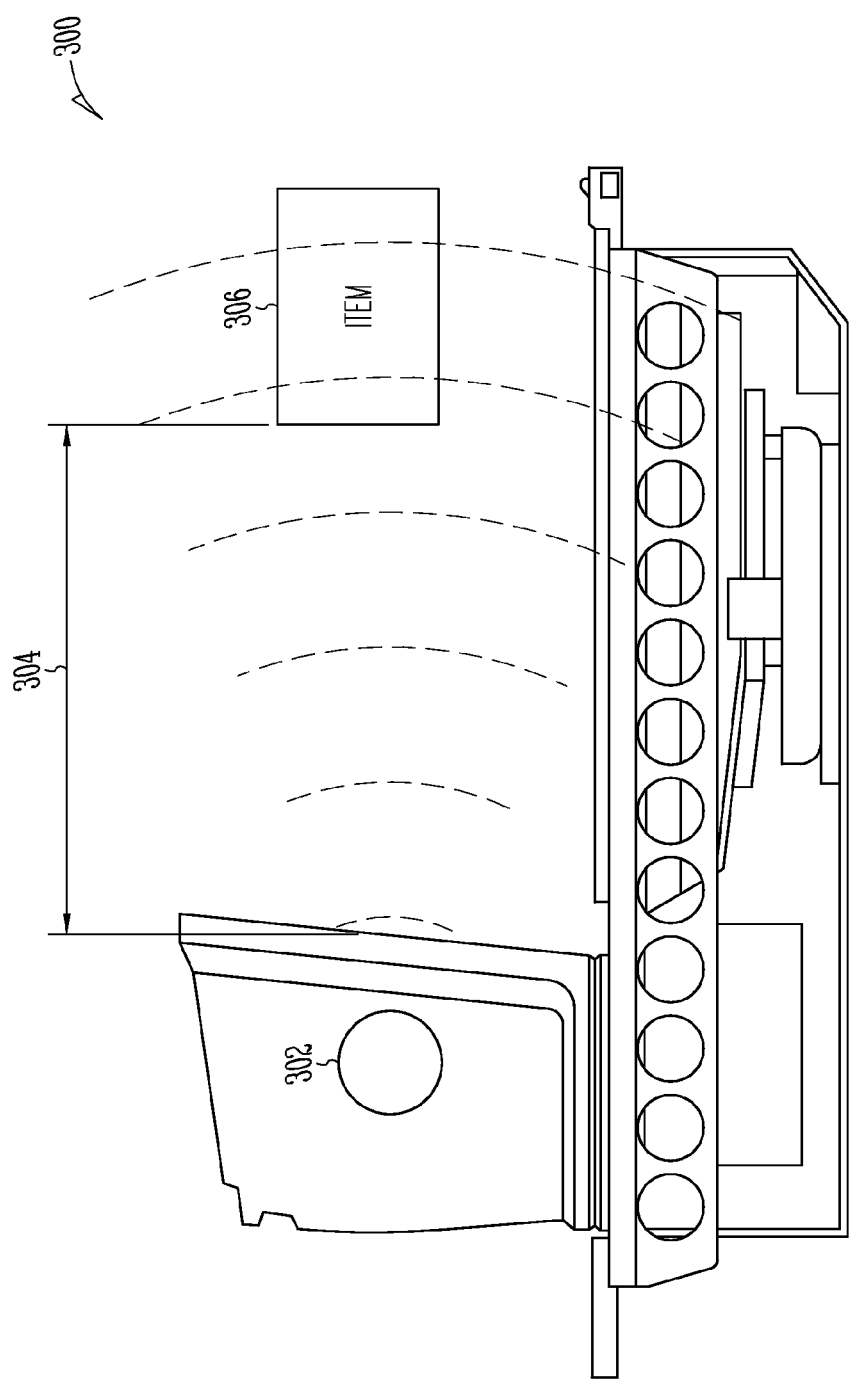
FIG. 3 is a scanner diagram, according to an example embodiment.

FIG. 3 is a scanner 300 diagram, according to an example embodiment. The scanner 300 is provided for purposes of illustrating an embodiment including an ultrasonic distance measuring device 302. Although the scanner 300 is illustrated as being a bi-optic scanner, the scanner 300 may instead have only a single scanning surface. The illustrated bi-optic scanner 300 includes only one ultrasonic distance measuring device 302. However, some embodiments may include an ultrasonic distance measuring device 302 on each of the scanning surfaces.

The ultrasonic distance measuring device 302 measures a distance between a scanning surface and the item 306 presented for scanning. The measured distance may then be provided to a lighting controller to set and adjust scan field lighting.

Figure 4:
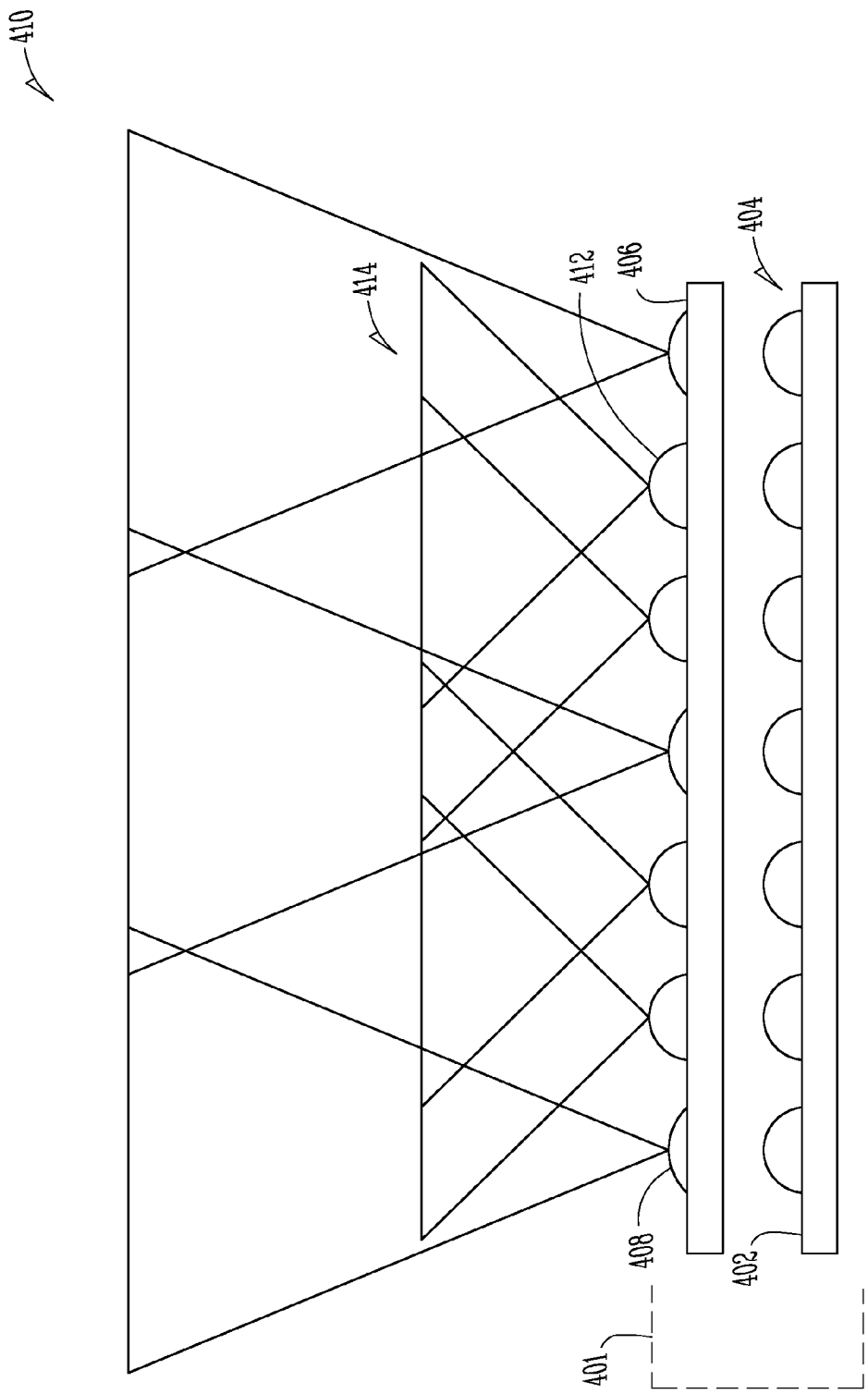
FIG. 4 illustrates two illuminated scanner lighting fields from a multi-array lighting device, according to an example embodiment.

FIG. 4 illustrates two illuminated scanner lighting fields 410, 414 from a multi-array lighting device 401, which is an example of scan field lighting module, according to an example embodiment.

The multi-array lighting device 401 includes an integrated circuit board 402 with light emitting diodes (LEDs) 404 fabricated thereon. The multi-array lighting device 401 also includes a lens array 406 that has wide-angle lenses 412 and narrow angle lenses 408 to focus light from the LEDs 404 to form the two illuminated lighting fields 414, 410, respectively. In some embodiments, the LEDs 404 may be turned on and off individually in an addressable manner, as groups, and otherwise. The lenses 408, 412 of the lens array align with the LEDs 404 when joined with the integrated circuit board 402 to form the multi-array lighting device 401. Generally, narrow angle lenses 408 are utilized to focus light at a further distance, such as illuminated lighting field 410, and wider-angle lenses 412 are utilized to focus light at a closer distance, such as illuminated lighting field 414.

FIG. 5 is a multi-array lighting module 500, according to an example embodiment. The multi-array lighting module 500 in an embodiment that includes a camera 502 integrated within an integrated circuit board of the module 500. The multi-array lighting module 500 includes LEDs with either a narrow angled lens, such as indicated at 504, or a wide angled lens, such as shown at 506. Each group of narrow angled lens and wide angled lens LEDs may be turned on and of independently of the other in some embodiments. However, all of the LEDs may be turned on or off at once in some embodiments or according to a configuration setting.

Figure 6:
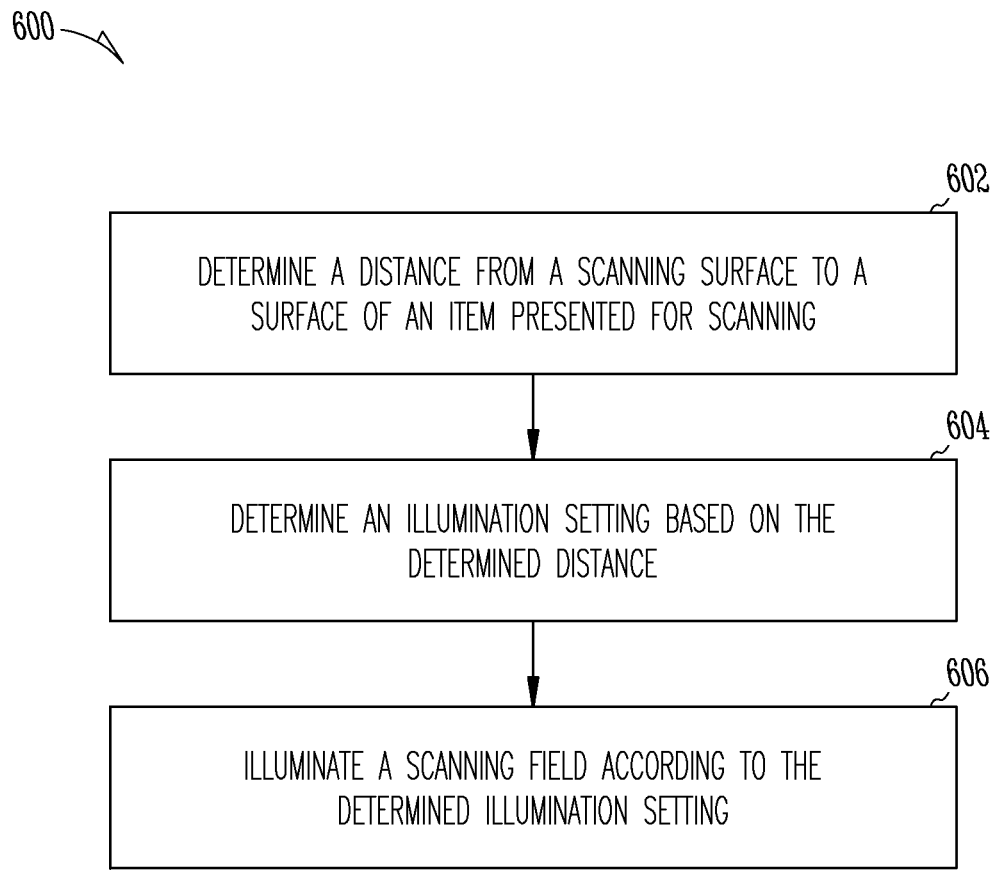
FIG. 6 is a block flow diagram of a method, according to an example embodiment.

FIG. 6 is a block flow diagram of a method 600, according to an example embodiment. The method 600 is an example of a method that may be performed on a scanner to automatically tune scan field lighting.

The example method 600 includes determining 602 a distance from a scanning surface to a surface of an item presented for scanning and determining 604 an illumination setting based on the determined distance. The method 600 may then illuminate 606 a scanning field according to the determined illumination setting.

In some embodiments, determining 602 the distance from the scanning surface to the presented item includes receiving a distance measurement from an ultrasonic distance measuring device to the surface of the presented item.

Some embodiments of the method 600 may further include sending a control signal to a scanning device to scan the presented item. The scanning device of some such embodiments includes an imaging device. Some such embodiments of the method 600 may further include receiving an image from the scanning device and determining whether an image brightness is adequate, too low, or too high. When the image brightness is determined to be adequate, the method 600 includes sending a second control signal to the scanning device to scan the presented item. When the image brightness is determined to be too low, the method 600 includes storing an increase to the illumination setting for the determined distance and sending a second control signal to the scanning device to scan the presented item. Further, when the image brightness is determined to be too high, a decrease to the illumination setting for the determined distance may be stored and a second control signal may be sent to the scanning device to scan the presented item.

In some embodiments, determining 604 the illumination setting based on the determined distance includes retrieving at least one illumination setting from a memory device of a scanner controller. The at least one illumination setting may include at least one of data identifying one or more lighting arrays to illuminate and data defining a brightness setting.

Another embodiment is a method of a scanner lighting controller. This method includes receiving, from a distance determining module, a determined distance between a scanning surface and a surface of an item presented for scanning. The method further includes selecting at least one illumination setting for a lighting module including at least one lighting array based on the determined distance and then providing the selected illumination setting to the lighting array. In some embodiments, the at least one illumination setting for the lighting module is selected based on the determined distance includes illumination settings to illuminate two lighting arrays. The illumination setting to illuminate the two arrays may include a brightness setting for each of the two lighting arrays.

Some other embodiments are of a scanner including a scanning module with a scanning surface imaged by an imaging device and a lighting module including at least one adjustable lighting element that is illuminated according a received illumination setting. The scanner of such an embodiment further includes a distance determining module that determines a distance between the scanning surface and a presented item. The scanner further includes a lighting controller that receives a determined distance from the distance determining module, determines the illumination setting based on the determined distance, and provides the illumination command to the lighting module. In some embodiments, the scanner is a bi-optic scanner having two imaging surfaces, each imaging surface including a scanning module, a lighting module, and distance determining module. However, in some of these embodiments, the lighting controller is shared by the two imaging surfaces.

In one embodiment of this method, the lighting controller may determine the illumination setting by retrieving at least one illumination setting from a memory device, the illumination setting including at least one of data identifying one or more lighting arrays of the lighting module to illuminate and data defining a brightness setting.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

The invention claimed is:

1. A method of illuminating a scanning field comprising:
    determining a distance measurement from a scanning surface to a surface of an item presented for scanning;
    determining an illumination setting based on the determined distance measurement;
    illuminating a scanning field according to the determined illumination setting; and
    sending a control signal to a scanning device including an imaging device to scan the presented item.

2. The method of illuminating a scanning field of claim 1, wherein determining the distance measurement from the scanning surface to the presented item includes receiving the distance measurement from a distance sensor to the surface of the presented item.

3. The method of illuminating a scanning field of claim 1, the method further comprising:
    receiving the image from the scanning device;
    determining whether an image brightness is adequate, too low, or too high;
    when the image brightness is determined to be:
        adequate, sending a second control signal to the scanning device to scan the presented item;
        too low, storing an increase to the illumination setting for the determined distance measurement and sending a second control signal to the scanning device to scan the presented item; and
        too high, storing a decrease to the illumination setting for the determined distance measurement and sending a second control signal to the scanning device to scan the presented item.

4. The method of illuminating a scanning field of claim 1, wherein:
    the scanning surface is a first scanning surface of a bi-optic scanner, the first scanning surface imaged by a first imaging device;
    the bi-optic scanner includes a second scanning surface approximately perpendicular to the first scanning surface, the second scanning surface imaged by a second imaging device;
    the surface of the presented item is approximately parallel to the first scanning surface and approximately perpendicular to the second scanning surface; and
    determining the distance measurement from the first scanning surface to the presented item surface includes:
        capturing an image by a second imaging device; and
        identifying a location of the presented item surface in the captured image in relation to known distance measurements to the first scanning surface within a field of view of the second imaging device.

5. The method of illuminating a scanning field of claim 4, wherein:
    the presented item surface is a first surface of the presented item;
    the determined distance measurement is a first determined distance measurement;
    the illumination setting is a first illumination setting; and
    the scanning field is a first scanning field of the first imaging device;
    the method further comprising:
        determining a second distance measurement from the second scanning surface to a second surface of the presented item, the determining of the second distance measurement including:
            capturing an image by the first imaging device; and
            identifying a location of the second surface of the presented item in the image captured by the first imaging device in relation to known distance measurements to the second scanning surface within a field of view of the first imaging device;
        determining a second illumination setting based on the second determined distance measurement; and
        illuminating a second scanning field of the second imaging device according to the determined second illumination setting.

6. The method of illuminating a scanning field of claim 1, wherein determining the illumination setting based on the determined distance measurement includes retrieving at least one illumination setting from a memory device of a scanner controller.

7. The method of illuminating a scanning field of claim 6, wherein the at least one illumination setting includes at least one of data identifying one or more lighting arrays to illuminate and data defining a brightness setting.

8. The method of illuminating a scanning field of claim 7, wherein retrieving the at least one illumination setting based on the determined distance measurement includes retrieving an illumination setting to illuminate:

a first set of light emitting diodes (LEDs) that each transmit light through a wide angle lens of the LED when the determined distance measurement is less than a distance threshold; and a second set of LEDs that each transmit light through a narrow angle lens of the LED when the determined distance measurement is greater than the distance threshold.

9. The method of illuminating a scanning field of claim 8, wherein:

the distance threshold is a range; and retrieving the at least one illumination setting based on the determined distance measurement further includes retrieving an illumination setting to illuminate both first and second sets of LEDs when the determined distance measurement is within the distance threshold.

10. A method of an imaging scanner lighting controller comprising:

receiving, from a distance determining module, a determined distance measurement between a scanning surface imaged by an imaging device of the imaging scanner and a surface of an item presented for scanning;

selecting at least one illumination setting for a lighting module including at least one lighting array based on the determined distance measurement; and providing the selected illumination setting to the lighting array.

11. The method of the scanner lighting controller of claim 10, wherein the at least one illumination setting for the lighting module selected based on the determined distance measurement includes illumination settings to illuminate two lighting arrays.

12. The method of claim 11, wherein the illumination setting to illuminate the two arrays include a brightness setting for each of the two lighting arrays.

13. A scanner comprising:

a scanning module including a scanning surface imaged by an imaging device;

a lighting module including at least one adjustable lighting element that is illuminated according to a received illumination setting;

a distance determining module that determines a distance measurement between the scanning surface and a presented item; and a lighting controller that receives a determined distance measurement from the distance determining module, determines the illumination setting based on the determined distance measurement, and provides the illumination command to the lighting module.

14. The scanner of claim 13, wherein the distance determining module includes an ultrasonic sensor.

15. The scanner of claim 13, wherein the scanner is a bi-optic scanner having two imaging surfaces, each imaging surface including a scanning module, a lighting module, and distance determining module.

16. The scanner of claim 15, wherein the lighting controller is shared by the two imaging surfaces.

17. The scanner of claim 16, wherein two imaging surface are first and second imaging surfaces and the distance determining module of the first imaging surface determines the determined distance measurement from an image received from the scanning module imaging device of the second imaging surface.

18. The scanner of claim 13, wherein the lighting controller determines the illumination setting by retrieving at least one illumination setting from a memory device, the illumination setting including at least one of data identifying one or more lighting arrays of the lighting module to illuminate and data defining a brightness setting.

19. The scanner of claim 18, wherein the at least one illumination setting retrieved by the lighting controller based on the determined distance measurement includes retrieving an illumination setting to illuminate:

a first set of light emitting diodes (LEDs) that each transmit light through a wide angle lens of the LED when the determined distance measurement is less than a distance threshold; and a second set of LEDs that each transmit light through a narrow angle lens of the LED when the determined distance measurement is greater than the distance threshold.

* * * * *